April 15, 1924.

L. A. VOELL

BAIT BOX

Filed Jan. 31, 1922

1,490,868

WITNESSES

INVENTOR
Louis A. Voell
BY
ATTORNEYS

Patented Apr. 15, 1924.

1,490,868

UNITED STATES PATENT OFFICE.

LOUIS ANTON VOELL, OF FOND DU LAC, WISCONSIN.

BAIT BOX.

Application filed January 31, 1922. Serial No. 533,014.

*To all whom it may concern:*

Be it known that I, LOUIS ANTON VOELL, a citizen of the United States, and a resident of Fond du Lac, in the county of Fond du Lac and State of Wisconsin, have invented a new and Improved Bait Box, of which the following is a full, clear, and exact description.

This invention relates to improvements in bait boxes, an object of the invention being to provide a bait box for live bait, such as frogs and grasshoppers and to provide improved means associated with the box for preventing the accidental escape of the bait when the user desires to remove one or more of the frogs or grasshoppers from the box.

Another object is to provide a bait box, which will be simple and practical in construction, strong, durable and efficient in use, and comparatively inexpensive to manufacture.

With these and other objects in view, the invention consists in certain novel features of construction and combinations and arrangements of parts as will be more fully hereinafter described and pointed out in the claims.

In the accompanying drawings:—

Figure 1:
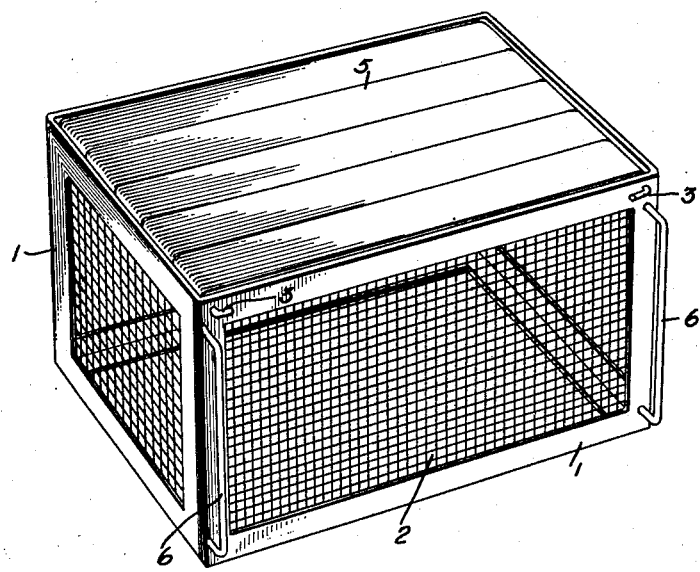
Figure 1 is a perspective view of my improved bait box.
Figure 2:
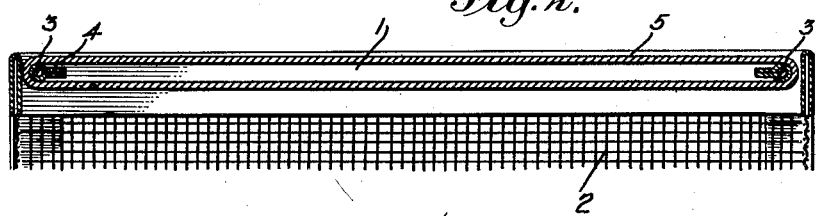
Figure 2 is an enlarged fragmentary view in longitudinal section through the box.
Figure 3:
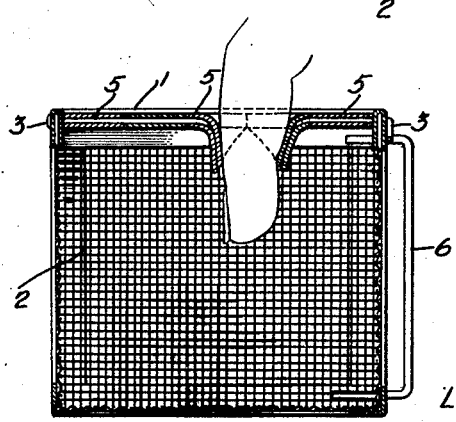
Figure 3 is a view in transverse section through the bait box, illustrating the manner of removing the bait from the box.

Referring in detail to the drawings, 1 represents a rectangular open boxlike frame. Wire netting 2 secured to the sides and to the bottom of the frame forms the sides and bottom of my improved bait box. Any approved means for attaching the netting to the frame may be employed. Mounted transversely across the frame adjacent the ends of the open top thereof are a pair of parallel horizontal rods 3. Strips of metal 4 bent along longitudinal lines to form strengthening sleeves are located around the rods within the box. The box cover is formed of a plurality of comparatively narrow endless elastic bands 5 located side by side and receiving at each end one of the rods 3. The bands are stretched taut between the rods and the sleeves 4 prevent the rods from bending under the strain exerted by the bands.

Laterally extending brackets such as 6 may be provided on one side of the box for the reception of a strap or belt to facilitate the transportation of the bait box.

The manner of use of the box will be apparent. Bait may be introduced into the box between the elastic bands which will automatically close together after the fingers of one inserting the bait have been removed. The user may in like manner insert his thumb and forefinger between the bands to remove bait from the box. With the ordinary form of bait box which employs either a sliding top or hinged cover opening of the top or cover to remove one frog or grasshopper frequently results in the escape of a great deal of the bait. With my improved bait box, it is impossible for one of the insects or reptiles to escape. By employing comparatively narrow elastic bands, a number of them will be required to close the box and access thereby had to any part of the box, so as to facilitate the removal of the bait.

Although I have illustrated one of the preferred embodiments of my invention, it will be evident that various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

I claim:

1. A bait box having its top closed by a series of comparatively narrow endless elastic bands stretched across the top with the members of each band in spaced relation and the edges of the several bands in engagement with each other, whereby light bands may be employed and access to any part of the box can be readily had to remove the bait.

2. A bait box including an open top, rods journaled transversely across the ends of the open top, and a plurality of parallel endless elastic bands stretched between the rods.

3. A bait box including an open top, rods journaled transversely across the ends of the open top, and a plurality of parallel endless elastic bands stretched between the rods, and means preventing bending of the rods.

4. A bait box including an open top, rods journaled transversely across the ends of the open top, and a plurality of parallel elastic bands stretched between the rods, and means preventing bending of the rods, said last mentioned means including metal strips bent along longitudinal lines to form sleeves and encircling said rods.

LOUIS ANTON VOELL.